2-BENZYL-3-HYDROXY AND LOWER ALKOXY PIPERIDINES

Robert L. Clarke, Bethlehem, N.Y., assignor to Sterling Drug Inc., New York, N.Y., a corporation of Delaware
No Drawing. Filed Feb. 6, 1963, Ser. No. 256,536
5 Claims. (Cl. 260—294.7)

This invention relates to 3-piperidinols, and is more particularly concerned with certain 2-substituted derivatives thereof and methods for the preparation of such derivatives.

Among the compounds of the invention are those of the formula

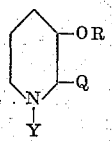

where R is hydrogen or lower-alkyl having one to four carbon atoms; Q is benzyl; and Y is hydrogen, lower-alkyl or benzyl and carboxylic acid esters thereof derived from carboxylic acids having from one to about ten carbon atoms and having a molecular weight less than about 200.

The term "lower-alkyl," e.g., as one of the meanings for R and Y in the above formula, as used herein, means alkyl radicals having from one to four carbon atoms and is illustrated by methyl, ethyl, n-propyl, isopropyl, n-butyl, isobutyl, and the like.

When Y and Q in the above formula are benzyl, the benzene ring thereof can be substituted by low-molecular weight substituents such as lower-alkyl and halo. These substituents can be in any of the available positions of the benzene nucleus, and where more than one substituent is present, they can be the same or different and they can be in any of the various position combinations relative to each other. The lower-alkyl substituents can have preferably from one to four carbon atoms which can be methyl, ethyl, n-propyl, isobutyl and the like. The halo substituents can be any of the halogens thus including fluoro, chloro, bromo and iodo.

Tho compounds of the invention where R is hydrogen are prepared by heating an appropriate α-Q-N-Y-tetrahydrofurfurylamine with hydrogen bromide in acetic acid followed by treatment with alkali. The reaction is carried out using a temperature range of about 65° C. to about 100° C.

The piperidinols of the invention can be converted into esters, i.e., acyloxypiperidines. When acyloxy groups are present in the piperidine moiety, the acyl radicals are preferably derived from carboxylic acids having from one to about ten carbon atoms and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxylower-alkanoyl radicals, e.g., succinyl (β-carboxypropionyl); cycloalkyl-lower alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; mono-carbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The 3-piperidinols of the invention can be converted into various ester derivatives, for instance using the well-known Schotten-Baumann reaction, i.e., treating the 3-piperidinol with an appropriate acid halide under basic conditions.

The ether derivatives (R=lower-alkyl) of the 3-piperidinols are prepared by conventional methods, e.g., reaction of the appropriate metal alcoholate with an alkyl sulfate or coupling of the appropriate alcoholate of an alkali metal with a lower-alkyl halide.

The racemic 2-benzyl-3-piperidinols of the invention can exist in the form of geometric isomers distinguished by whether the hydroxyl and benzyl groups stand in a cis-relationship or a trans-relationship to each other. The assignment of a particular structure is based on the stereochemical relationship of the intermediate α-benzyl-N-Y-tetrahydrofurfurylamines which exist in two diastereo-isomeric, optically inactive forms. Each of these forms gives a different piperidinol one of which shows intramolecular hydrogen bonding and the other of which shows only intermolecular bonding upon infrared spectral absorption determination. The isomer exhibiting intramolecular bonding is assigned the cis configuration because the hydroxy group is sufficiently near the ring nitrogen for intramolecular hydrogen bonding to occur. The trans isomer on the other hand is too far removed from the ring nitrogen and only intermolecular hydrogen bonding can occur. Since no bond involving an asymmetric center is broken during the transformations the precursor of the trans piperidinol must be the erythro-β-benzyl-N-Y-tetrahydrofurfurylamine and the precursor of the cis-piperidinol the threo-α-benzyl-N-Y-tetrahydrofurfurylamine.

The intermediate α-benzyl-N-Y-tetrahydrofurfurylamines are disclosed and claimed in my copending application Serial No. 116,666, filed June 13, 1961, now U.S. Patent No. 3,091,621, as a continuation-in-part of Serial No. 836,343, filed August 27, 1959, and now abandoned.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing the invention, it has been found convenient to form the hydrochloride salt. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion exchange procedures.

The chemical structures of the compounds are established by the chemical and physical isomeric interrelationships outlined above and by the mode of synthesis, and corroborated by the correspondence of calculated and found values for the elementary analyses.

Compounds of this invention which were prepared as described in the following examples were found to produce psychomotor stimulation like that produced by amphetamine. Thus, when tested in mice by a modification of the method of Dews, they were found to increase the spontaneous activity of the animals. In this test procedure mice were placed in an activity cage through which a beam of light passed and impinged on a photoelectric cell so adjusted that a mouse breaking the light path activated a magnetic counter. Representative compounds of the invention, each dissolved in distilled water, were administered intraperitoneally to mice in groups of five and the number of interruptions of the light beam was recorded for a thirty minute period. The threshold dose for each of the indicated compounds was as follows: 2-benzyl-3-piperidinol, 16 mg./kg.; 1,2-dibenzyl-3-methoxypiperidine, 8 mg./kg.; and 1-cis-2-benzyl-1-ethyl-3-piperidinol, 8 mg./kg.;

The following examples will further illustrate the invention without however limiting the latter thereto.

Example 1

*Trans-2-benzyl-1-methyl-3-piperidinol.*—Dry hydrogen bromide was bubbled into a mixture of 61 g. of *dl*-erythro-α-benzyl-N-methyltetrahydrofurfurylamine in 24 ml. of glacial acetic acid at 70–75° C. A total of 26 g. of hydrogen bromide was absorbed in two hours after which the viscous solution was heated to 95° C. for three and one-half hours. The mixture was cooled, diluted with 10 ml. of water, 100 ml. of 35% sodium hydroxide added and the mixture extracted with ether. The ether was removed and the residue treated with 100 ml. of ethanol and 25 ml. of 35% sodium hydroxide then refluxed for five hours. The solvent was removed by distillation and the residue extracted with ether. After the ether extracts were dried over sodium sulfate the ether was removed and the residue distilled. There was thus obtained 32 g. of trans-2-benzyl-1-methyl-3-piperidinol, B.P. 116–120° C. (0.4 mm.) and having the molecular formula $C_{13}H_{19}NO$.

The free base was treated with 28 ml. of 6.33 N ethanolic hydrogen chloride and 200 ml. of ether to give 33 g. of trans-2-benzyl-1-methyl-3-piperidinol hydrochloride, M.P. 196–198° C.

The benzoate ester of trans-2-benzyl-1-methyl-3-piperidinol was prepared from 26 g. of the alcohol and 24 g. of benzoyl chloride in 100 ml. of benzene containing 8 g. of sodium hydroxide in 50 ml. of water. The ester (16.4 g.) was obtained by elution from a chromatographic column containing 600 g. of silica gel with a 30% ether–70% pentane mixture and converted to the hydrochloride salt by reaction with 6.8 ml. of 7.79 N alcoholic hydrogen chloride. There was thus obtained 10.6 g. of 2-benzyl-1-methyl-3-piperidinol benzoate hydrochloride, M.P. 204–205° C., and having the molecular formula $C_{20}H_{24}ClNO_2$.

The 3,4,5-trimethoxybenzoate ester of trans-2-benzyl-1-methyl-3-piperidinol was prepared from 4.1 g. of the alcohol and 4.6 g. of trimethoxybenzoyl chloride in 50 ml. of dioxane. The ester thus obtained was treated with 2.4 ml. of 7 N alcoholic hydrogen chloride to give, after recrystallization from anhydrous ethanol, 5 g. of trans-2-benzyl-1-methyl-3-piperidinol 3,4,5 - trimethoxybenzoate hydrochloride having the molecular formula $C_{23}H_{30}ClNO_5$ and melting at 206–208° C.

Example 2

*Cis-2-benzyl-1-methyl-3-piperidinol* was prepared from 10 g. of *dl* - threo-α-benzyl-N-methyltetrahydrofurfurylamine and dry hydrogen bromide using the procedure described above for the preparation of trans-2-benzyl-1-methyl-3-piperidinol. After recrystallization from n-hexane there was obtained 0.95 g. of cis -2-benzyl-1-methyl-3-piperidinol, M.P. 74–75° C.

Example 3

*Trans-2-benzyl-3-methoxy-1-methylpiperidine.*—A mixture of 18 g. of trans-2-benzyl-1-methyl-3-piperidinol and 2.4 g. of sodium hydride in 200 ml. of benzene was refluxed for five hours after which 12.6 g. of methyl sulfate in 50 ml. of benzene was added dropwise. After the addition was complete the mixture was refluxed for one hour, then cooled. The mixture was treated with 140 ml. of 10% aqueous sodium hydroxide solution, the layers separated and the aqueous layer extracted with ether. The combined organic layers were washed with saturated salt solution and the basic product extracted with 2 N aqueous hydrochloric acid. Basification of the acid extracts with 35% sodium hydroxide, separation of the liberated base with ether and removal of the ether from the sodium sulfate-dried extracts gave an oil which was distilled. The portion which boiled at 76–80° (0.08 mm.) was 90% pure product based on the methoxyl content.

To a solution of 8.8 g. of the impure product in 50 ml. of ethanol was added 9.5 g. of picric acid dissolved in a minimum of hot ethanol. The solid picrate salt which precipitated was recrystallized from methanol to give 16.1 g. of golden, massive prisms, M.P. 79–84° C.

The picrate salt was treated with an excess of 10% sodium hydroxide solution and the free base extracted with four portions of ether. The ether extracts were washed with water, dried over sodium sulfate and freed from ether. Distillation of the residual oil gave 6.0 g. of trans-2-benzyl-3-methoxy-1-methyl-piperidine, B.P. 87–95° C. (0.27 mm.) and having the molecular formula $C_{14}H_{21}NO$.

Example 4

*1,2-dibenzyl-3-piperidinol hydrochloride* was prepared from 12.3 g. of N,α-dibenzyltetrahydrofurfurylamine and dry hydrogen bromide using the procedure described above in Example 1. There was thus obtained 2.7 g. of 1,2-dibenzyl-3-piperidinol hydrochloride as a white powder, M.P. 192–193° C. having the molecular formula $C_{19}H_{24}ClNO$.

Example 5

*1,2-dibenzyl - 3 - methoxypiperidine hydrochloride* was prepared from 18.25 g. of 1,2-dibenzyl-3-piperidinol, 4 g. of sodium hydride and 10.4 g. of dimethyl sulfate in 250 ml. of benzene using the procedure described in Example 3. The oil obtained was treated with 5 ml. of alcoholic hydrogen chloride to form the hydrochloride salt which was recrystallized from acetonitrile. There was thus obtained 8.3 g. of 1,2-dibenzyl-3-methoxypiperidine hydrochloride, M.P. 171–185° C., having the molecular formula $C_{20}H_{26}ClNO$.

Example 6

*2-benzyl-3-piperidinol.*—A mixture of 6.4 g. of 1,2-dibenzyl-3-piperidinol in 300 ml. of ethanol was hydrogenated over palladium on charcoal at 50 p.s.i. The catalyst was removed by filtration and the solvent removed by distillation under reduced pressure. The solid which separated was recovered by filtration and recrystallized from n-hexane. There was thus obtained 3.4 g. of 2-benzyl-3-piperidinol, M.P. 109–111° C., having the molecular formula $C_{12}H_{17}NO$.

Example 7

*2-benzyl-3-methoxypiperidine hydrochloride* was prepared by hydrogenation of 5.8 g. of 1,2-dibenzyl-3-methoxypiperidine over palladium on charcoal using the procedure described above in Example 6. The residue was treated with 2.5 ml. of 9 N alcoholic hydrogen chloride and the solid which separated collected by filtration. Recrystallization from ethyl acetate gave 2.4 g. of 2-benzyl-3-methoxypiperidine hydrochloride, M.P. 161–162° C., having the molecular formula $C_{13}H_{20}ClNO$.

Example 8

*l*-cis-2-benzyl-1-ethyl-3-piperidinol was prepared from 25.5 g. of *l* - threo-α-benzyl - N - ethyltetrahydrofurfurylamine and hydrogen bromide using the procedure described above in Example 1. There was thus obtained 15.5 g. of *l*-cis-2-benzyl-1-ethyl-3-piperidinol, M.P. 78–80° C., having the molecular formula $C_{14}H_{21}NO$.

Treatment of the above piperidinol with thionyl chloride in chloroform did not give the expected 3-chloro derivative but rather a dehydration product. Thus cis-2-benzyl-1-ethyl-3-piperidinol on reaction with thionyl chloride gave 2 - benzyl -1- ethyl - 1,2,5,6-tetrahydropyridine, M.P. 179–181° C., having the molecular formula $C_{14}H_{20}ClN$. This compound was also prepared by treating pyridine ethiodide with benzylmagnesium chloride to form 2-benzyl-1-ethyl-1,2-dihydropyridine which was reduced with sodium borohydride to the desired compound.

Replacement of the *l*-threo-α-benzyl-N-ethyltetrahydrofurfurylamine of Example 8 with *dl*-threo-α-benzyl-N-ethyltetrahydrofurfurylamine gave *dl* - cis - 2 - benzyl - 1- ethyl-3-piperidinol, M.P. 66–68° C. and replacement with *dl*-erythro-α-benzyl-N-ethyltetrahydrofurfurylamine gave *dl*-trans-2-benzyl-1-ethyl - 3 - piperidinol, B.P. 117–120°/0.45 mm.

I claim:
1. A compound selected from the group consisting of compounds having the formula

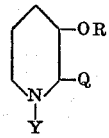

where R is selected from the group consisting of hydrogen and lower-alkyl having one to four carbon atoms; Q is benzyl; Y is selected from the group consisting of hydrogen, lower-alkyl having one to four carbon atoms and benzyl.
2. 2-benzyl-1-methyl-3-piperidinol.
3. 2-benzyl-3-methoxy-1-methylpiperidine.
4. 2-benzyl-3-piperidinol.
5. 2-benzyl-3-methoxypiperidine.

References Cited by the Examiner

Teotino: "J. Org. Chem.," vol. 27, pages 1906–1908 (1962).

NICHOLAS S. RIZZO, *Primary Examiner.*